United States Patent
Agustoni et al.

(10) Patent No.: US 12,504,075 B2
(45) Date of Patent: Dec. 23, 2025

(54) METHOD FOR MANUFACTURING GASKET SEALS FROM THIS ASSEMBLY

(71) Applicant: The Swatch Group Research and Development Ltd, Marin (CH)

(72) Inventors: Enzo Agustoni, Cudrefin (CH); Alexandre Girardin, Neuchâtel (CH); François Erdemli, Colombier (CH)

(73) Assignee: The Swatch Group Research and Development Ltd, Marin (CH)

( * ) Notice: Subject to any disclaimer, the term of this patent is extended or adjusted under 35 U.S.C. 154(b) by 610 days.

(21) Appl. No.: 17/960,492

(22) Filed: Oct. 5, 2022

(65) Prior Publication Data

US 2023/0161293 A1    May 25, 2023

(30) Foreign Application Priority Data

Nov. 25, 2021 (EP) ...................................... 21210354

(51) Int. Cl.
| | | |
|---|---|---|
| *F16J 15/10* | (2006.01) | |
| *B29C 65/00* | (2006.01) | |
| *B29D 99/00* | (2010.01) | |
| *G04B 37/08* | (2006.01) | |
| *G04B 37/11* | (2006.01) | |

(52) U.S. Cl.
CPC ......... *F16J 15/108* (2013.01); *B29C 66/5221* (2013.01); *B29D 99/0053* (2013.01); *G04B 37/08* (2013.01); *G04B 37/11* (2013.01)

(58) Field of Classification Search
CPC ........ F16J 15/022; F16J 15/027; F16J 15/104; F16J 15/108; G04B 39/02; G04B 37/08; G04B 37/11; G04G 17/08; B29C 66/5221; B29D 99/0053

See application file for complete search history.

(56) References Cited

U.S. PATENT DOCUMENTS

| | | | | |
|---|---|---|---|---|
| 3,660,192 | A | * 5/1972 | Smith | ................. F16J 15/108 |
| | | | | 156/122 |
| 4,136,515 | A | 1/1979 | Thompson et al. | |
| 4,159,829 | A | * 7/1979 | Ditcher | .............. B29D 99/0053 |
| | | | | 277/606 |
| 4,883,279 | A | * 11/1989 | Sabo | ....................... F16C 33/72 |
| | | | | 277/500 |

(Continued)

FOREIGN PATENT DOCUMENTS

| | | |
|---|---|---|
| FR | 2 878 306 A1 | 5/2006 |
| GB | 2391721 A | 2/2004 |

(Continued)

OTHER PUBLICATIONS

European Search Report for 21 21 0354 dated Apr. 29, 2022.

*Primary Examiner* — Nicholas L Foster
(74) *Attorney, Agent, or Firm* — Sughrue Mion, PLLC

(57) ABSTRACT

A method for manufacturing gasket seals by producing, through machining operations, a plurality of cuts in an assembly (10) produced by at least two identical joined tubes (20), each tube (20) extending along a longitudinal axis between two ends, the end of one tube (20), referred to as "first end" (21), having a shape complementary to the shape of the end of the other tube (20), referred to as "second end" (22), so that said first and second ends (21, 22) cooperate by complementarity of shape.

5 Claims, 1 Drawing Sheet

(56) References Cited

U.S. PATENT DOCUMENTS

| | | | | |
|---|---|---|---|---|
| 5,280,927 A | * | 1/1994 | Greisinger | H02G 15/013 |
| | | | | 277/609 |
| 7,829,001 B2 | * | 11/2010 | Gladfelter | B29C 66/5261 |
| | | | | 264/296 |
| 8,966,824 B2 | * | 3/2015 | Gladfelter | B29C 66/5261 |
| | | | | 49/498.1 |
| 2008/0001366 A1 | * | 1/2008 | Gladfelter | B29C 66/73152 |
| | | | | 277/575 |
| 2011/0024996 A1 | * | 2/2011 | Gladfelter | B29C 65/02 |
| | | | | 277/654 |

FOREIGN PATENT DOCUMENTS

| | | |
|---|---|---|
| JP | 9-100917 A | 4/1997 |
| WO | 2008/039596 A2 | 4/2008 |

\* cited by examiner

METHOD FOR MANUFACTURING GASKET SEALS FROM THIS ASSEMBLY

CROSS REFERENCE TO RELATED APPLICATION

This application claims priority to European Patent Application No. 21210354.3 filed Nov. 25, 2021, the entire contents of which are incorporated herein by reference.

TECHNICAL FIELD OF THE INVENTION

The invention falls within the field of microengineering, and is particularly advantageously applied in the field of horology.

More specifically, the invention relates to a method for manufacturing gasket seals from this assembly.

TECHNOLOGICAL BACKGROUND

Gasket seals intended to be arranged in watch cases are produced from cutting, generally by machining with cutting tools, for example by milling or by turning, an assembly of tubes joined together in a collinear manner.

The tubes have a cylindrical shape and include a transverse section defining the shape of the gasket obtained after machining.

In order to be fixed without degree of freedom in relation to one another, the tubes may be soldered at their opposite ends. For example, to this end, two tubes are bearingly arranged by one of their ends against a hot plate until their melting temperature is reached, and said ends are subsequently held against one another until cooled.

It is also possible, alternatively to soldering, to glue two adjoining tubes at their interface by spreading a glue layer on their respective ends and by holding them in position on a template until the glue has dried.

However, such solutions, in addition to having the drawback of posing difficulties of respecting collinearity tolerances, generate a bead, respectively of solder or of glue, forming a burr on the inner and outer surfaces of the assembly.

Alternatively, the tubes may be connected together by means of dedicated parts, such as connection sleeves, for example to be screwed, well known by the person skilled in the art.

Such a solution is generally long and tedious to implement, in addition to generating an additional cost by adding additional parts in the assembly.

SUMMARY OF THE INVENTION

The invention resolves the aforementioned drawbacks by proposing a solution making it possible to guarantee the collinearity of the tubes joined together, control the appearance of the outer surface of the assembly and not requiring assembly templates or additional parts other than the tubes for producing the assembly.

To this end, the present invention relates to a method for manufacturing gasket seals consisting in producing, through machining operations, a plurality of cuts in an assembly produced by at least two identical joined tubes, each tube extending along a longitudinal axis between two ends, the end of one tube, referred to as "first end", having a shape complementary to the shape of the end of the other tube, referred to as "second end", so that said first and second ends cooperate by complementarity of shape.

Advantageously, the assembly makes it possible to guarantee the collinearity of the tubes with one another, and thus eliminate any risk of unbalance that could be detrimental during the machining of said assembly.

Moreover, these features make it possible to avoid any burrs on the outer surface of the assembly.

Another advantage of the invention resides in the fact that it makes it possible to control the dimensions of the tubes, and thus of the assembly.

In particular implementations, the invention may further include one or more of the following features, taken alone or according to any technically possible combinations.

In particular implementations, the manufacturing method includes, before carrying out the machining operations, a preliminary step of producing the assembly wherein the tubes are obtained by moulding then joined together, so as to obtain said assembly.

In particular implementations, the manufacturing method includes, before carrying out the machining operations, a preliminary step wherein, for each tube, a cylindrical body is produced by extrusion and a first end is produced by moulding, then said first end is fixed to said cylindrical body, and finally the tubes thus formed are joined together so as to obtain said assembly.

In particular implementations, during the preliminary step, the first end is overmoulded on the cylindrical body.

In particular implementations, when the tubes are joined, they are screwed together, at their first and second respective opposite ends.

In particular implementations, when the tubes are joined, they are glued or driven together, at their first and second respective opposite ends.

According to another aspect, the present invention relates to a watch comprising a gasket seal obtained by implementing the method as described above, and comprising a case formed by a middle, a crystal and a back. The gasket is arranged against the middle, so as to be interposed between a back and the middle, between the crystal and the middle, or between the bezel and the middle.

BRIEF DESCRIPTION OF THE FIGURES

Other features and advantages of the invention will become apparent upon reading the following detailed description given by way of non-limiting example, with reference to the appended drawings wherein.

It should be noted that the figures are not to scale.

DETAILED DESCRIPTION OF THE INVENTION

Figure 1:
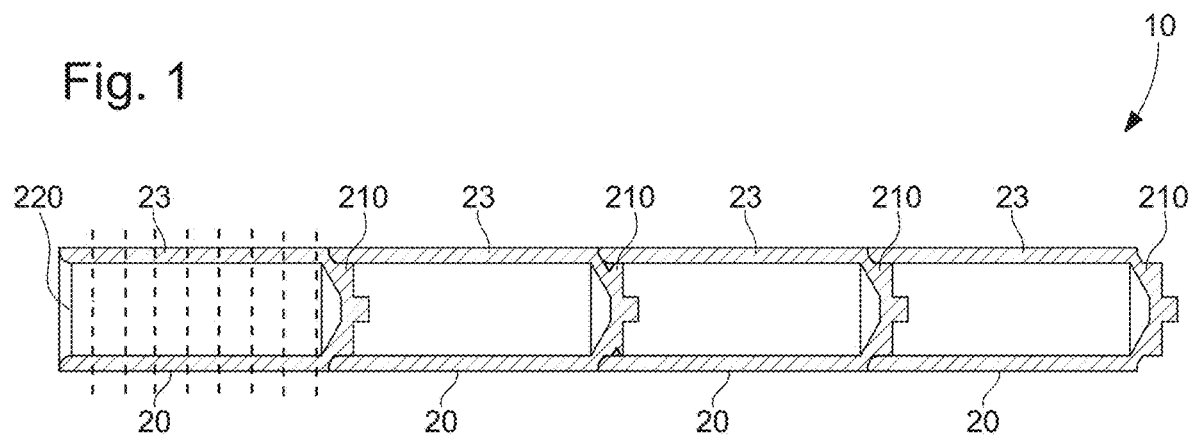
FIG. 1 shows a sectional view of an assembly intended to be machined to produce gasket seals, said assembly comprising four joined tubes.

FIG. 1 shows an assembly 10, intended to be machined to produce gasket seals according to the present invention.

The assembly 10 includes a plurality of tubes 20, preferably identical, joined so as to form a bar extending along a longitudinal axis combined with that of each tube 20.

Figure 2:
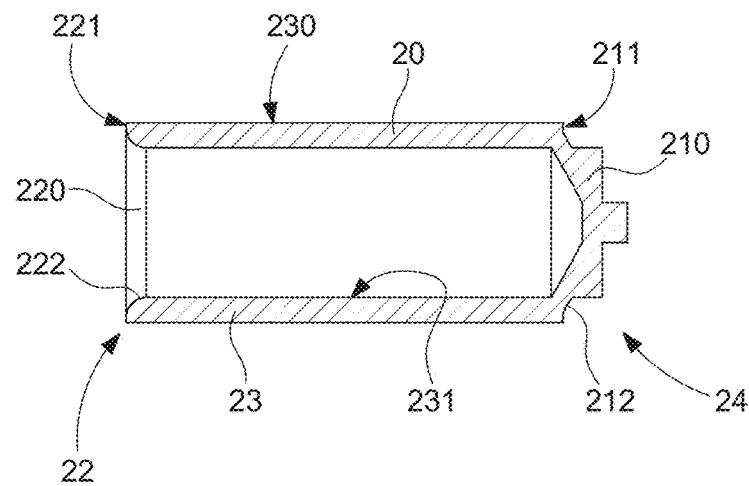
FIG. 2 shows a sectional view of a tube of the assembly of FIG. 1.
Figure 3:
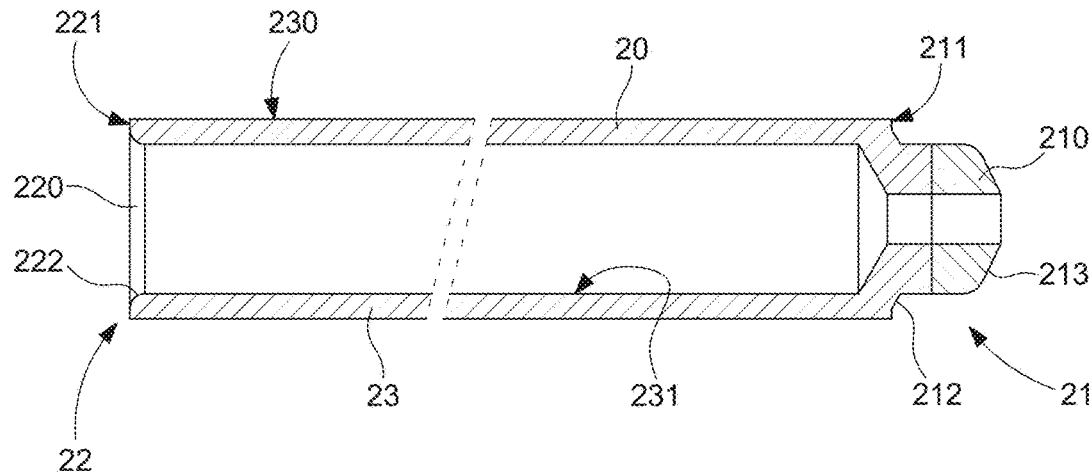
FIG. 3 shows a sectional view of a tube according to another alternative embodiment of the invention.

As illustrated in FIGS. 2 and 3 in various alternative embodiments of tubes 20, each tube 20 extends between a first and a second end 21 and 22 having complementary shapes, so that the first end 21 of one tube 20 cooperates by complementarity of shape with the second end 22 of another tube 20.

Thus, the assembly 10 consists of a plurality of tubes 20 successively joined together by each of their first and second ends 21 and 22, with the exception of the tubes 20 arranged at the ends of the assembly The tubes 20 are fixed together without degree of freedom, for example by driving and/or by gluing at their interface.

The first end 21 of each tube 20 advantageously includes a post 210 extending along a longitudinal axis of the tubes 20, from a radial surface 211 with which it forms an annular shoulder.

The second end 22 is formed by an axial opening 220 opening on an end surface 221 and wherein the post 210 of an adjacent tube 20 is engaged, as shown in FIG. 1, so that the radial surface 211 from which said post 210 extends is bearingly arranged against said end surface 221, this contact defining the axial positioning of the two tubes 20 adjacent to one another.

The radial positioning of the two adjacent tubes 20 is defined by the engagement of the post 210 in the opening 220.

More specifically, in the embodiment of the invention shown in FIGS. 1 to 3, between its first and second ends 21 and 22, each tube 20 includes a hollow cylindrical body 23 defined between an outer surface 230 and an inner surface 231, the opening 220 being materialised by the inner surface 231 of the second end 22.

The inner surface 231 of the second end 22 may advantageously receive the possible glue layer mentioned above in the text, to increase the fixing between the two tubes 20, so that the glue does not project beyond the outer surface 230.

Alternatively, the glue layer may be applied on the outer surface of the post 210.

In the preferred embodiment of the invention shown in the figures, each tube 20 is monobloc in that it is formed in one piece.

The cylindrical body 23 may or may not have a shape of revolution.

In FIGS. 1 and 2, the tubes 20 are blind insofar as the opening 220 only opens on their second end 22, whereas in the alternative embodiment shown in FIG. 3, the tubes 20 have a through opening 220 also opening on the first end 21.

Advantageously, the second end 22 may include a chamfer or a neck-moulding 222 defined between the end surface 221 and the inner surface 231 in order to facilitate the engagement of the post 210 of a tube 20 in the opening 220 of another tube 20 and thus, to facilitate the production of the assembly 10.

In order to perfect the cooperation of shape between the first and the second end 21 and 22, the first end 21 may include a chamfer or neck-moulding 212 defined between the radial surface 211 and the post 210. The neck-moulding 212 of the first end 21 of each tube 20 is then opposite the chamfer or neck-moulding 222 of the second end 22 of the adjacent tube 20 with which said first end 21 cooperates, except for a tube 20 constituting one end of the assembly 10; for example the end tube 20 to the right of the assembly 10 that can be seen in FIG. 1.

In this same objective, the post 210 may comprise a chamfer or a neck-moulding 213 at its free end, as illustrated in FIG. 3.

Advantageously, the complementary shapes of the first and second ends 21 and 22 are not shapes of revolution, in order to prohibit any possible rotation between the tubes 20.

Thus, the assembly 10 is more resistant to the torsional forces particularly endured during the machining of the assembly 10. This feature makes it possible to significantly reduce the risks of rupture of the assembly 10, that is to say the separation of two adjacent tubes 20, during the machining of the gaskets.

More specifically, the transverse sections of the posts 210 and of the openings 220 may be of polygonal shape, for example square, triangular, etc., or of curved shape, for example oval, poly-lobed, etc.

Alternatively, the respective first and the second ends 21 and 22 of two adjacent tubes 20 may cooperate with one another by means of a helical connection. More specifically, the posts 210 may be threaded so as to be engaged by screwing into the openings 220 that are then tapped.

In another embodiment of the invention not shown in the figures, for each tube 20, the cylindrical body 23 and the post 210 may be formed independently from one another, so that the tube 20 results from the securing of a cylindrical body 23 and of a post 210.

In this case, the cylindrical body 23 and the post 210 may be of different materials and may be driven and/or glued.

Only the portions of the tubes 20 of the assembly 10 that are outside of the interfaces between the first and second ends 21 and 22 are usable, insofar as they are intended to form, after successive transverse cutting operations of the assembly 10 by machining, the gasket seals. In other words, the portions of the assembly 10 consisting of the interfaces between the first and second ends 21 and 22 of the tubes 20 are not used and constitute rejects.

By way of example, each tube 20 may have a length between 20 and 80 centimetres, preferably 30 centimetres.

These length values of the tubes 20 are advantageous because they constitute a good compromise between a length of the tubes 20 that is too difficult to produce by moulding operation, and a length that is too short minimising the usable portions of each tube 20.

As mentioned above, the method for manufacturing gasket seals consists in producing a plurality of transverse cuts in an assembly 10 by machining operations with cutting tools, particularly turning, and in particular profile-turning. The cuts may be followed by complementary machining operations, such as milling operations, in order to true the section of the gaskets obtained.

The length of the assembly 10 may be of a plurality of metres and is in practice only limited by machining machine constraints.

The manufacturing method includes, before carrying out machining operations, a preliminary step of producing the assembly 10, wherein the tubes 20 are obtained by moulding, then joined together.

Alternatively, during the preliminary step, for each tube 20, the cylindrical body 23 is produced by extrusion and the first end 21 is produced by moulding, then each first end 21 is fixed to a cylindrical body 23, and finally, the tubes 20 thus formed are joined together.

More specifically, during the preliminary step, the first end 21 may be overmoulded on the cylindrical body 23.

The present invention is particularly adapted to obtain gasket seals intended to be arranged against a middle of a watch case, for example interposed between a back and the middle, a crystal and the middle or a bezel and the middle.

By way of example, the material of the tubes 20 is a polymer, particularly a polyurethane, preferably that of the type known by the person skilled in the art under the trade name "Asutane".

More generally, it should be noted that the implementations and embodiments considered above have been described by way of non-limiting examples, and that other variants are consequently possible.

The invention claimed is:

1. A method for manufacturing at least one gasket seal, comprising:
   forming an assembly (10) including at least two identical joined tubes (20), each tube (20) extending along a longitudinal axis between two ends, one of the ends of each of the tubes is a first end (21) which has a shape complimentary to a shape of the other of the ends of each tube which is a second end (22), so that the first end (21) of one of the tubes cooperates with the second end (22) of another one of the tubes by complementarity of shape; and
   cutting the assembly into the at least one gasket seal.

2. The manufacturing method according to claim 1, including, before forming the assembly, performing a preliminary step in which for each tube (20), a cylindrical body (23) is produced by extrusion and the first end (21) is produced by moulding, and then said first end (21) is fixed to said cylindrical body (23).

3. The manufacturing method according to claim 2, wherein during the preliminary step, the first end (21) is overmoulded on the cylindrical body (23).

4. The manufacturing method according to claim 1, wherein when the tubes (20) are joined, they are screwed together, at the first end of the one of the tubes and at the second end of the another one of the tubes.

5. The manufacturing method according to claim 1, wherein when the tubes (20) are joined, they are glued or driven together, at the first end of the one of the tubes and at the second end of the another one of the tubes.

* * * * *